3,483,290
BACTERIAL FRACTIONS

Frank M. Berger and Jean P. Rosselet, Princeton, and Bernard J. Ludwig, North Brunswick, N.J., assignors to Carter-Wallace, Inc., New York, N.Y., a corporation of Maryland
No Drawing. Filed Oct. 24, 1967, Ser. No. 677,742
Int. Cl. A61k 23/00
U.S. Cl. 424—92     4 Claims

ABSTRACT OF THE DISCLOSURE

A material obtainable from bacterial protoplasm, hereinafter referred to as "protodyne." Said material is capable of increasing the resistance to infectious agents in warm-blooded animals. Various methods of obtaining protodyne from bacterial protoplasm are described.

---

The invention relates to novel fractions obtainable from bacterial protoplasm. More particularly, the invention relates to novel fractions which are capable of increasing the resistance to infectious agents in warm-blooded animals and which have an unusually low degree of toxicity and pyrogenicity.

It has been recognized for some time that certain substances, known as endotoxins, may be obtained from microorganisms, primarily from gram-negative bacteria. Said endotoxins, which are isolated from the bacterial cell walls by various methods of extraction, are generally characterized as being made up predominantly of polysaccharides, and having substantial amounts of glucosamine and lipids contained therein. In addition, the various endotoxins, even after extensive purification steps, still retain substantial degrees of toxicity and pyrogenicity.

It is an object of the invention to provide novel fractions from bacterial protoplasm which are capable of increasing the resistance to infectious agents in warm-blooded animals and which possess an unusually low degree of toxicity and pyrogenicity. It is another object of the invention to provide novel bacterial fractions which consist primarily of proteinaceous material and which contain, at most, only minor amounts of glucosamine, lipids and polysaccharides. These and other objects will become apparent to those skilled in the art in the light of the instant specification, which follows.

In its broad aspect, the invention relates to novel fractions which are extracted from bacterial protoplasm, as opposed to bacterial cell walls from which endotoxins are obtained. Said fractions, which have been named "protodyne," have the following characteristics:

(a) A high content of proteinaceous material, in the order of 85% or higher.

(b) A low glucosamine content, in the order of 2% or less.

(c) A low lipid content, expressed in terms of free fatty acids, in the order of 2% or less.

(d) A low carbohydrate content, in the order of 2% or less.

(e) Substantially stable when heated in distilled water, 0.1 N acetic acid, 0.01 N ammonium hydroxide, or in buffer (pH 8.6) for 5 minutes at 100° C.

(f) Readily soluble in 0.1 N NaOH, poorly soluble in 4 M urea solution and insoluble in water, 1 N HCl and 0.1 N HCl. Solubility studies were conducted at a concentration of 10 mg. of protodyne per milliliter of solvent.

(g) Having an extinction coefficient, measured at 280 m$\mu$ using a 1% weight/volume solution of protodyne in 0.1 N NaOH solution, in the range of about 9 to about 22.

The preferred fractions of the invention are substantially free of glucosamine, lipids and carbohydrates.

Protodyne can be obtained from cells of gram-negative microorganisms, such as *Escherichia coli*, grown in a suitable medium. While the detailed examples which follow hereinafter are directed specifically to *E. coli*, it is to be understood that other gram-negative microorganisms can be similarly used. For example, protodyne can be successfully extracted from cells obtained from cultures of *Achromobacter xerosis* and *Serratia marcescens*.

In general, the mehtod of obtaining protodyne from cells involves the steps of disrupting or disintegrating the cells to obtain the bacterial protoplasm therefrom, of separating the protoplasm from the cell wall materials, and of extracting the protodyne from said protoplasm. For comparison purposes, the endotoxin fraction, which is present in the cell wall material, was also extracted in most experimental runs.

The step of disrupting or disintegrating the cells can be performed by any one of several methods, i.e., by zeolite cell disruption, by mechanical pressure cell disintegration, or by freeze-thaw cell disruption. Detailed examples of each method will be given hereinafter. The removal of the protodyne from the bacterial protoplasm is preferably effected by phenol extraction, regardless of the method used for disintegrating or disrupting the cells.

The following are specific working examples for the preparation of protodyne according to the present invention.

EXAMPLE 1.—DISINTEGRATION STEP (a) By zeolite cell disruption

Freshly harvested *E. coli* cells (95.5 g.) were frozen and disrupted with 100 g. of powdered 3A zeolite (dehydrated crystalline sodium aluminum silicate). Crushed Dry Ice was added to the dry mass to maintain the temperature below 10° C. The mixture was agitated using a Hobart blender for about 20–25 minutes at 4° C. until a powdery mass was obtained.

To the solid mass there was added 500 ml. of physiological saline solution and the suspension was agitated at 4° C. for 5 minutes.

After centrifugation at about 28,00×G for 1 hour at 4° C., the clear supernatant liquid had a solid content of 19.2 mg./ml. (7.68 g.), after subtraction for the saline content.

The cell extract was further clarified by centrifuging at about 78,000×G at 4° C. for 2 hours in a Spinco Model L centrifuge.

The extract, which contained 15.8 mg./ml. solids (5.77 g.), was used for the phenol extraction, described hereinafter.

(b) By mechanical pressure cell disintegration 95.3 g. (wet weight) freshly harvested *E. coli* cells were washed twice with approximately 300 ml. portions of physiological saline solution at 4° C. and centrifuged for 30 min. at about 30,000×G. The washed cells (69.5 g.) were suspended in 650 ml. physiological saline solution and the volume adjusted to 700 ml. with saline solution. The solid content was 23.8 mg./ml. (16.6 g.) after deduction of the saline content.

The disintegration in the Ribi cell fractionator (Model CF1) was performed at about 30,000 p.s.i., a gas flow rate of 35 c.f.m., at temperatures varying from 7–10° C. The resulting suspension was centrifuged at about 48,000×G for 1 hour at 4° C. to separate cell wall material from protoplasmic material.

The crude protoplasm fraction was clarified by centrifuging at about 78,000×G for 2 hours in a Spinco Model L centrifuge and then used for the phenol extraction.

(c) By freeze-thaw disruption 95.5 g. freshly harvested E. coli cells were frozen. The frozen cells were suspended in 250 ml. sterile water and the mixture dispersed in a Waring Blendor, by agitating for about 25 minutes at 4° C. The suspension was centrifuged at about 25,000×G for 1 hour at 4° C. The aqueous supernatant liquid had a volume of 350 ml. and a solid content of 15.7 mg./ml.

This aqueous cell extract was centrifuged at about 78,000×G in a Spinco Model L centrifuge for 2 hours at 4° C. The clear supernatant liquid, which had a volume of 290 ml. and a solid content of 15.5 mg./ml., was subsequently extracted with phenol according to the method of Example II.

EXAMPLE II.—Phenol extraction

A protoplasmic fraction as obtained after mechanical pressure cell disintegration (1431 ml., solid content of 9.6 mg./ml. or 13.7 g. total solids) was preheated to 68° C. and admixed with an equal volume (1431 ml.) of 88% phenol also preheated to 68° C. The mixture was agitated at 68° C. for 30 minutes and rapidly chilled to 8–10° C. After centrifugation at about 4000×G for 30 minutes the phases were separated from each other. The *phenol phase* was preheated to 68° C. and agitated for 10 minutes with an equal volume of preheated water. The phases were separated by centrifugation as above.

The washed phenol phase was admixed with 60 ml. of saturated methanolic sodium acetate solution. Four volumes (6000 ml.) of methyl alcohol were used to precipitate a fluffy solid which was isolated by centrifugation at about 28,000×G for 1 hour at 4° C. The residue was suspended in water, dialyzed against running cold distilled water for 48 hours at 4° C. and lyophilized. The yield of phenol-soluble protoplasmic material (protodyne) was 1.46 g. of colorless amorphous solid.

Table I, which follows, sets forth a representative number of protodyne fractions of the present invention, in addition to the characteristics thereof. The biuret content is indicative of the amount of proteinaceous material present. The carbohydrate content indicates the amount of polysaccharides present in the fraction. The free fatty acid (FFA) assay is a measure of the lipids content.

aeruginosa, the mice were infected intravenously 48 hours after treatment with protodyne. With all microorganisms, the number of viable cells given was adjusted in preliminary titrations to produce deaths in 90% of the animals within 48 hours. When 90% of the untreated control animals were dead, usually 24 to 48 hours after infection, the median protective dose ($PD_{50}$), i.e., the dose at which 50% of the treated animals survived, was calculated. Each experiment was repeated 3 to 5 times with similar results.

The results are tabulated in Table II which follows:

TABLE II.—INCREASED RESISTANCE TO INFECTION IN MICE PRODUCED BY PROTODYNE PREPARED FROM ESCHERICHIA COLI

| Organism | Number of viable organisms given | Protodyne $PD_{50}$, mg./kg.[1] | Confidence limits [2] |
|---|---|---|---|
| Salmonella typhosa | 4.55×10⁵ | 0.032 | 0.015–0.067 |
| Salmonella typhimurium | 1.12×10⁵ | 0.052 | 0.030–0.093 |
| Salmonella enteritidis | 1.3×10⁵ | 0.059 | 0.038–0.091 |
| Diplococcus pneumoniae | 7.0×10³ | 0.29 | 0.16–0.56 |
| Pseudomonas aeruginosa | 4.6×10⁷ | 0.44 | 0.27–0.70 |
| Streptococcus mastitidis | 9.7×10⁴ | 0.59 | 0.33–1.00 |

[1] Dose protecting 50% of animals from death by infection.
[2] 95% confidence limits.

The pyrogenicity of protodyne was evaluated in male New Zealand albino rabbits using the technique of Landy et al. (Fed. Proc., 1957, v. 16, 857). Protodyne, in doses of 0.5 μg./kg. produced a maximum temperature rise of 0.8±0.1° F., substantially lower than values reported for endotoxins.

In addition, protodyne appears quite non-toxic. Mice tolerated a dose of 400 mg./kg. intraperitoneally without any discernible changes in appearance or behavior.

What is claimed is:

1. Bacterial fractions, referred to as protodyne, obtainable from bacterial protoplasm of cells of gram-negative microorganisms, including *Escherichia coli, Achromobacter xerosis* and *Serratia marcescens*, obtained by the steps of:

(1) disrupting or disintegrating the cells at about 4° C. by zeolite cell disruption, by mechanical pressure cell disintegration, or by freeze-thaw cell disruption to obtain the bacterial protoplasm therefrom;

TABLE I

| | Source | Method of disruption | C | H | N | O | P | Protein[1] | Carbohydrate[2] | FFA[3] | E[4] | Glucosamine[5] |
|---|---|---|---|---|---|---|---|---|---|---|---|---|
| Preparation No.: | | | | | | | | | | | | |
| 1 | E. coli | MPC[6] | 48.35 | 6.48 | 15.59 | 24.30 | 0.59 | 94.19 | 0.61 | 0.45 | 22.9 | 62 |
| 2 | E. coli | MPC | 48.55 | 6.59 | 15.55 | 26.70 | 0.33 | 99.90 | 0.30 | 0.78 | 15.8 | 0.76 |
| 3 | E. coli | MPC | | | | | | 100.20 | 1.49 | | | |
| 4 | E. coli | MPC | 49.36 | 6.85 | 15.37 | 27.56 | | 93.95 | 0.62 | 0.43 | 15.3 | 0.50 |
| 5 | E. coli | MPC | 48.68 | 6.58 | 15.13 | 25.95 | 0.22 | 94.89 | 0.81 | 0.28 | 14.0 | 0.44 |
| 6 | E. coli | MPC | | | | | 0.27 | 86.50 | <0.5 | 0.18 | 12.4 | 1.00 |
| 7 | E. coli | Zeolite | 49.15 | 7.22 | 15.78 | 27.49 | 0.01 | 95.40 | 0.98 | 0.06 | 9.7 | None |
| 8 | A. xerosis | MPC | 49.31 | 7.01 | 15.60 | 26.85 | 0.33 | 85.70 | 0.20 | 0.06 | 10.3 | 1.01 |
| 9 | S. marcescens | MPC | 49.75 | 6.97 | 15.88 | 25.40 | 0.13 | 97.60 | 0.20 | 0.24 | 11.7 | 0.48 |
| 10 | S. marcescens | MPC | 49.47 | 7.37 | 15.27 | 24.67 | 0.09 | 90.0 | 1.80 | 1.13 | 11.5 | 0.63 |
| 11 | E. coli | Freeze-thaw | | | | | | 95.43 | 1.15 | 0.27 | | |

[1] Protein content as determined by Biuret assay [Gornall et al., J. Biol. Chem., 177, 751 (1948)].
[2] Determined by tryptophane method [Badin et al., Prac. Soc. Exptl. Biol. Med., 84, 288 (1953)].
[3] Expressed as methyl palmitate and determined by gas liquid chromatographic method of Knivett and Cullen, Biochem. J., 96, 771, 1965.
[4] Extension coefficient, $E_{280\ m\mu}^{1\%}$ (0.1N NaOH).
[5] Determined by the method of Elson and Morgan (Biochem. J., 27, 1824, 1933).
[6] MPC—Mechanical pressure cell disintegration.

The ability of protodyne to enhance non-specific resistance to infections in warm-blooded animals was evaluated in mice of the Swiss Webster strain, utilizing *Salmonella typhimurium, Salmonella typhosa, Salmonella enteritides, Pseudomonas aeruginosa, Diplococcus pneumoniae,* and *Steptococcus mastitidis* as the infectious agents. Protodyne was given intraperitoneally at 5 different dose levels. Groups of 20 mice were used at each dose level and protodyne was administered in a single injection 24 hours prior to infection. The microorganisms, with the exception of *Pseudomonas aeruginosa*, were administered intraperitoneally. In the case of *Pseudomonas*

(2) separating the phenol-soluble protoplasm from the cell wall material from the phenol phase of a phenol extraction at about 68° C.;

(3) precipitating at about 4° C., and lyophilizing, from said phenol-soluble protoplasm, a colorless amorphous solid protodyne fraction, said fractions being capable, upon intraperitoneal administration, of increasing the non-specific resistance to infectious agents, including *Salmonella typhimurium, Salmonella typhosa, Salmonella enteritides, Pseudomonas aeruginosa, Diplococcus pneumoniae* and *Steptococcus mastitidis,* in warm-blooded animals and having a low degree of toxicity and pyrogenicity, said fractions having the following characteristics:
(a) a high content of proteinaceous material, in the order of 85% or higher.
(b) a low glucosamine content, in the order of 2% or less
(c) a low lipid content, expressed in terms of free fatty acids, in the order of 2% or less
(d) a low carbohydrate content, in the order of 2% or less
(e) substantially stable when heated in distilled water, 0.1 N acetic acid, 0.01 N ammonium hydroxide, or in buffer (pH 8.6) for 5 minutes at 100° C.
(f) readily soluble in 0.1 N NaOH, poorly soluble in 4 M urea solution, and insoluble in water, 1 N and 0.1 N HCl, solubility studies being conducted at a concentration of 10 mg. of protodyne per milliliter of solvent
(g) having an extinction coefficient, measured at 280 m. using a 1% weight/volume solution of protodyne in 0.1 N NaOH, in the range of about 9 to about 22.

2. The bacterial fraction of claim 1, substantially free of glucosamine.

3. The bacterial fraction of claim 1, substantially free of lipids.

4. The bacterial fraction of claim 1, substantially free of carbohydrates.

References Cited

UNITED STATES PATENTS

| | | | |
|---|---|---|---|
| 2,340,318 | 2/1944 | Gerlough | 424—92 XR |
| 3,089,821 | 5/1963 | Folkers | 424—92 |
| 3,119,741 | 1/1964 | Freedman et al. | 424—92 |
| 3,132,995 | 5/1964 | Berger et al. | 424—92 |
| 3,148,120 | 9/1964 | Westphal | 424—92 |
| 3,342,684 | 9/1967 | Lembke et al. | 424—92 |

S. K. ROSE, Primary Examiner